United States Patent
Boni et al.

(10) Patent No.: US 10,984,168 B1
(45) Date of Patent: Apr. 20, 2021

(54) SYSTEM AND METHOD FOR GENERATING A MULTI-MODAL ABSTRACT

(71) Applicant: International Business Machines Corporation, Armonk, NY (US)

(72) Inventors: Odellia Boni, Giva'at Ela (IL); Guy Feigenblat, Givataym (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/785,668

(22) Filed: Feb. 10, 2020

(51) Int. Cl.
*G06F 40/103* (2020.01)
*G06F 40/166* (2020.01)
*G06F 16/93* (2019.01)
*G06F 16/34* (2019.01)

(52) U.S. Cl.
CPC .......... *G06F 40/103* (2020.01); *G06F 16/345* (2019.01); *G06F 16/94* (2019.01); *G06F 40/166* (2020.01)

(58) Field of Classification Search
CPC .................................................. G06F 16/345
See application file for complete search history.

(56) References Cited

U.S. PATENT DOCUMENTS

| | | | | |
|---|---|---|---|---|
| 6,002,798 A * | 12/1999 | Palmer | .................. | G06F 16/313 |
| | | | | 382/176 |
| 6,972,763 B1 | 12/2005 | Millett | | |
| 9,633,008 B1 * | 4/2017 | Brand | .................... | G06F 16/345 |
| 2014/0250375 A1 * | 9/2014 | Malik | .................... | G06F 16/345 |
| | | | | 715/254 |
| 2015/0317285 A1 * | 11/2015 | Duggal | .................. | G06F 16/345 |
| | | | | 715/242 |
| 2017/0147544 A1 * | 5/2017 | Modani | ............... | G06F 16/4393 |
| 2017/0185835 A1 | 6/2017 | Appel | | |

(Continued)

OTHER PUBLICATIONS

Chen et al. "Abstractive Text-Image Summarization Using Multi-Modal Attentional Hierarchical RNN," Proceedings of the 2018 Conference on Empirical Methods in Natural Language Processing, Brussels, Belgium, Oct. 31-Nov. 4, 2018: 4046-4056.

(Continued)

*Primary Examiner* — Asher D Kells
(74) *Attorney, Agent, or Firm* — G. E. Ehrlich (57) ABSTRACT

A system for generating a multi-modal summary of a digital document, comprising a processor adapted for: extracting from the document a plurality of graphical elements; generating a set of textual descriptions, each generated for one of the graphical elements and associated therewith; selecting, from the set of textual descriptions and a set of text fragments extracted from the document, a set of representative elements having a highest score computed by applying thereto a score function, where a set of representative elements' score is indicative of a degree by which the set of representative elements represents the document; for each representative element of the set of representative elements, where the element is a textual description of a graphical element of the plurality of graphical elements, replacing the element with the graphical element associated therewith; and generating, using the set of representative elements, another document comprising a multi-modal summary of the document.

16 Claims, 7 Drawing Sheets

(56) References Cited

U.S. PATENT DOCUMENTS

2018/0276296 A1* 9/2018 Gerlach .................. G06F 16/38
2020/0097569 A1* 3/2020 Sewak .................. G06F 16/739

OTHER PUBLICATIONS

Hullman et al. "Picturing Science: Design Patterns in Graphical Abstracts," in Diagrams 2018: Diagrammatic Representation and Inference. LNCS, vol. 10871, Springer, Cham, 10th International Conference on the Theory and Application of Diagrams, Edinburgh, United Kingdom, Jun. 18, 2018: 183-200.
Koncel-Kedziorski et al. "Text Generation from Knowledge Graphs with Graph Transformers," Proceedings of NAACL-HLT 2019: 2284-2293.

* cited by examiner

SYSTEM AND METHOD FOR GENERATING A MULTI-MODAL ABSTRACT

BACKGROUND

The present invention, in some embodiments thereof, relates to a system and method for generating a graphical abstract of a document and, more specifically, but not exclusively, to generating a graphical abstract of an academic article.

Publishing is a business of making information available to the public, particularly sale or dissemination of literature, music, or information. Publishing may use digital media, for example a compact disk or a web site. Additionally, or alternatively publishing may use non-digital media, for example print, for example a book or a magazine. As used henceforth, the term publisher refers to an entity that publishes information. In addition, as used henceforth, the term document refers to a piece of written, printed, or electronic matter that provides information.

There exist fields where a published document is accompanied by an abstract, briefly summarizing the document. An abstract of a document is often used to help a reader quickly ascertain the purpose of the document. Some examples of a document that may be published with an abstract are a research article, an academic thesis, a review, proceedings of a conference, a patent application, and analysis of a subject. Some abstracts have text only.

Even though some publishers limit an amount of words in a text-only abstract, there exist readers who want the facts presented clearly in a concise visual representation. A graphical abstract is a single-panel image designed to give a reader an immediate understanding of the document, allowing the reader to quickly determine whether the document is relevant to the reader's interest at a glance without having to read through the entire document text or even a text-only abstract.

A graphical abstract may be displayed in a list of results of an online search. Some other uses of a graphical abstract include appended to the beginning of the document wen it is published electronically, for example via a web site, and in an online directory of published documents.

SUMMARY

It is an object of the present invention to provide a system and a method for generating a multi-modal summary of a digital document.

The foregoing and other objects are achieved by the features of the independent claims. Further implementation forms are apparent from the dependent claims, the description and the figures.

According to a first aspect of the invention, a system for generating a multi-modal summary of a digital document comprises at least one hardware processor adapted for: extracting from the digital document a plurality of graphical elements; generating a set of textual descriptions, each generated for one of the plurality of graphical elements and associated therewith; selecting, from the set of textual descriptions and a set of text fragments extracted from the digital document, a set of representative elements having a highest score computed by applying thereto a score function, where a set of representative elements' score is indicative of a degree by which the set of representative elements represents the digital document; for each representative element of at least some of the set of representative elements, where the representative element is a textual description of a graphical element of the plurality of graphical elements, replacing the representative element with the graphical element associated therewith; and generating, using the set of representative elements, another digital document comprising a multi-modal summary of the digital document.

According to a second aspect of the invention, a method for generating a multi-modal summary of a digital document comprises: extracting from the digital document a plurality of graphical elements; generating a set of textual descriptions, each generated for one of the plurality of graphical elements and associated therewith; selecting, from the set of textual descriptions and a set of text fragments extracted from the digital document, a set of representative elements having a highest score computed by applying thereto a score function, where a set of representative elements' score is indicative of a degree by which the set of representative elements represents the digital document; for each representative element of at least some of the set of representative elements, where the representative element is a textual description of a graphical element of the plurality of graphical elements, replacing the representative element with the graphical element associated therewith; and generating, using the set of representative elements, another digital document comprising a multi-modal summary of the digital document.

According to a third aspect of the invention, a system for publishing a plurality of documents comprises at least one hardware processor adapted for: in each of a plurality of iterations: receiving a digital document; generating a multi-modal summary of the digital document by: extracting from the digital document a plurality of graphical elements; generating a set of textual descriptions, each generated for one of the plurality of graphical elements and associated therewith; selecting, from the set of textual descriptions and a set of text fragments extracted from the digital document, a set of representative elements having a highest score computed by applying thereto a score function, where a set of representative elements' score is indicative of a degree by which the set of representative elements represents the digital document; for each representative element of at least some of the set of representative elements, where the representative element is a textual description of a graphical element of the plurality of graphical elements, replacing the representative element with the graphical element associated therewith; and generating, using the set of representative elements, another digital document comprising a multi-modal summary of the digital document; adding the digital document to a repository of digital documents; and updating a directory of the repository to associate the digital document with the other digital document.

With reference to the first and second aspects, in a first possible implementation of the first and second aspects of the present invention at least one of the plurality of graphical elements is selected from a group consisting of: a photograph, a drawing, an illustration, an algorithm, a table, a chart, a flowchart, a diagram, a block diagram, a sequence diagram, and a graph. Optionally, selecting the set of representative elements having a highest score comprises: using the set of textual descriptions and the set of text fragments extracted from the digital document as a plurality of source elements; associating each of the plurality of source elements with a probability value; in at least one of a plurality of iterations: generating a plurality of candidate sets of elements, each generated by selecting, from the plurality of source elements, a set of candidate elements, each candidate element selected according to the respective probability thereof; computing a plurality of candidate scores, each computed for one of the plurality of candidate sets of elements by applying the score function to the respective set of candidate elements; and modifying at least one probability value of at least one of the plurality of source elements according to the plurality of candidate scores for use in a next iteration of the plurality of iterations; identifying a highest score of the plurality of candidate scores computed in one or more of the plurality of iterations; and selecting the respective candidate set of elements associated with the highest score as the set of representative elements. Selecting a set of representative elements having a highest score increases a likelihood of the set of representative elements providing an immediate understanding of the digital document's take-home message, increasing accuracy of a multi-modal summary produced using the set of representative elements. Optionally, modifying the at least one probability value comprises: identifying in the plurality of candidate scores at least one iteration highest score; identifying in at least one high scoring candidate set of elements, associated with at least one of the at least one iteration highest score, at least one source element of the plurality of source elements; and increasing the at least one probability value associated with the at least one source element. Optionally, modifying the at least one probability value further comprises: identifying at least one other source element of the plurality of source elements not in the at least one high scoring candidate set of elements; and decreasing the at least one other probability value associated with the at least one other source element. Increasing a probability value of an element contributing to an iteration high score and additionally or alternatively decreasing a probability value of an element not contributing to an iteration high score increases a likelihood of a candidate set of representative elements generated in a future iteration having a high score, thus reducing computation time and amount of computation resources required to generate the set of representative elements, thus reducing cost of operation of a system implemented according to the present invention.

With reference to the first and second aspects, in a second possible implementation of the first and second aspects of the present invention applying the score function to the set of representative text elements comprises computing at least one of a similarity score, indicative of a degree of relevance of the set of representative text elements to a text of the digital document; a coverage score, indicative of a degree of representation by the set of representative text elements of the text of the digital document; a diversity score, indicative of an amount of dissimilar topics described by the set of representative text elements; a position score, indicative of a degree by which the set of representative text elements appear at the digital document's beginning; a size score, indicative of an amount of elements in the set of representative text elements; and an image detail score, indicative of an amount of details depicted in one or more graphical elements of the plurality of graphical elements described by one or more of the set of representative text elements. Optionally, applying the score function to the set of representative text elements comprises computing a product of the similarity score, the coverage score, the diversity score, the position score, the size score, and the image detail score.

With reference to the first and second aspects, in a third possible implementation of the first and second aspects of the present invention generating the other digital document using the set of representative elements comprises: generating the multi-modal summary of the digital document using the set of representative elements by: extracting from the digital document at least one section title by, for at least one representative element of the set of representative elements: identifying a first reference in the digital document to the at least one representative element; and extracting from the digital document a section title of a section of the digital document comprising the first reference; sorting the set of representative elements and the at least one section title according to a respective order of appearance in the digital document, to produce a sorted set of elements; and inserting in order the sorted set of elements into a digital image; and using the digital image when generating the other digital document. Optionally, generating the other digital document further comprises:

generating a plurality of interactive links, each generated for one of the set of representative elements being in the plurality of graphical elements and comprising the respective textual description associated with the representative element; and inserting the plurality of interactive links into the other digital document such that, when the other digital document is displayed on an interactive device, selection by a user of a graphical element of the other digital document instructs the interactive device to display the respective textual description associated with the graphical element. Displaying a textual description associated with a graphical element upon request from a user increases usability of a multi-modal summary generated according to the present invention, providing additional information without cluttering the digital image comprising the multi-modal summary.

With reference to the first and second aspects, in a forth possible implementation of the first and second aspects of the present invention the at least one hardware processor is further adapted for storing the other digital document on at least one non-volatile digital storage connected to the at least one hardware processor. Optionally, the at least one hardware processor is further adapted for sending the other digital document to at least one other hardware processor via at least one digital communication network interface connected to the at least one hardware processor.

With reference to the third aspect, in a first possible implementation of the third aspect of the present invention the at least one hardware processor is further adapted for: providing the directory of the repository; receiving a request for an abstract of the digital document, where the digital document is selected from the directory; and providing, in response to the request, the other digital document associated with the digital document. Optionally, providing the other digital document comprises displaying the other digital document on an interactive device connected to the at least one hardware processor. Optionally, the request is received from at least one other hardware processor via at least one digital communication network interface connected to the at least one hardware processor. Optionally, providing the other digital document comprises sending the other digital document to the at least one other hardware processor via the at least one digital communication network interface. Optionally, the at least one other hardware processor is adapted for displaying the other digital document on an interactive device connected to the at least one other hardware processor.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to a system and method for generating a graphical abstract of a document and, more specifically, but not exclusively, to generating a graphical abstract of an academic article.

For a graphical abstract to be useful, the graphical abstract should give a reader an immediate understanding of a main message or piece of information that can be learned from the document, also known as a take-home message. To achieve this goal, a graphical abstract should include elements that are related to the main message of the document. Some of the elements may be text, some of the elements may be graphical, providing a visual representation of information. A graphical abstract may be multi-modal, comprising both textual elements and graphical elements. In addition, when a graphical abstract comprises more than one element, either text or graphical, the graphical abstract should be designed such that it is clear to a reader in what order to follow the elements, for example from left to right or from top to bottom. As the graphical abstract is expected to provide a quick, "at a glance" understanding of the document, there is a need for the graphical abstract to comprise as few elements as possible, while still describing a breadth of ideas described in the document.

Henceforth the terms "figure" and "graphical element" are used interchangeably, and refer to any form of visual representation of information, for example a photograph, a diagram and a chart.

A graphical abstract of a document may be a multi-modal summary of the document, comprising one or more graphical elements and additionally or alternatively one or more textual elements. A common current solution for building a graphical abstract is to build a graphical abstract manually.

There exist solutions for selecting important figures in a digital document comprising a scientific paper, based on classification of a figure extracted from the digital document. Some such methods classify each figure according to figure characteristics, for example size of the figure, page number where the figure appears in the digital document, location of the figure on the page, aspect ratio of the figure, a color profile indicative of a distribution of colors in the figure, and a reference count indicative of an amount of references in the digital document to the figure. However, there exist cases where a single figure extracted from a document does not clearly demonstrate the full take-home message of the document. In addition, existing methods do not show how to combine several figures to produce a graphical abstract.

There exist methods to produce for a figure a textual synopsis, describing the contents of the figure. Some such methods produce a textual synopsis by extracting a set of sentences from the digital document comprising the figure, and computing for the synopsis a score that reflects one or more characteristics of the synopsis, for example similarity of the synopsis to a caption of the figure, similarity of the synopsis to a sentence in the digital document referencing the figure, presence of one or more identified cue words, proximity in the digital document of the figure to reference sentences, and an amount of sentences already chosen for the synopsis.

The present invention, in some embodiments thereof, proposes generating a multi-modal summary for a digital document using one or more textual descriptions of one or more graphical elements of the digital document to identify at least one graphical element to include in the multi-modal summary.

In such embodiments the present invention proposes generating a textual description for each of a plurality of graphical elements extracted from the digital document, and creating a pool of source elements comprising the plurality of textual descriptions, each generated for one of the graphical elements, and a set of text fragments extracted from the digital document. A text fragment may be a sentence. Other examples of a text fragment are a clause of a sentence, a caption, a title, and a word. The present invention further proposes, in some embodiments thereof, selecting from the pool of source elements a set of representative elements, and replacing each representative element that is a textual description of a graphical element with the respective graphical element described thereby, to produce a multi-modal set of representative elements comprising textual fragments and graphical elements. Optionally, the present invention proposes using the multi-modal set of representative elements to generate another digital document, comprising a multi-modal summary of the digital document. Optionally, the multi-modal summary is generated using the multi-modal set of representative elements. Using a pool of source elements comprising a set of textual descriptions and a set of text fragments allows using one or more text based methods to select the set of representative elements, increasing a likelihood of the set of representative elements providing an immediate understanding of the digital document's take-home message compared to using a single figure of the digital document or a text only summary, thus increasing accuracy of a multi-modal summary produced using the set of representative elements compared to a summary produces using text only or a single figure extracted from the digital document.

In addition, the present invention proposes, in some embodiments thereof, selecting the set of representative elements from a plurality of candidate sets of elements, according to a respective score computed for each of the plurality of candidate sets of elements. Optionally, the set of representative elements has a highest score of a plurality of scores computed for the plurality of candidate sets of elements. Optionally, each of the plurality of scores is computed by applying a score function to one of the plurality of candidate sets of elements. Optionally, the score is indicative of one or more qualities of the respective candidate set of elements, for example a degree of relevance of the respective candidate set of elements to a text of the digital documents. Other examples of a quality of a set of elements are a degree of representation of the text of the digital document by the set of elements, an amount of dissimilar topics described by the set of elements, a degree by which the set of elements appear at the beginning of the digital document, and an amount of elements in the set of elements. It may be desirable to select less detailed graphical elements, as more detailed graphical elements may be deemed less clear and less desirable for a graphical abstract. Optionally, the score is indicative of one or more image qualities of one or more graphical elements of the set of elements, some examples being a size of a graphical, an amount of references to a graphical element, and a distribution of a plurality of colors of a graphical element. Selecting a set of representative elements having a highest score increases a likelihood of the set of representative elements providing an immediate understanding of the digital document's take-home message, increasing accuracy of a multi-modal summary produced using the set of representative elements.

In addition, in some embodiments the present invention proposes an iterative process of generating in one or more of a plurality of iterations a plurality of candidate sets of representative elements and selecting, in each iteration, elements that contributed to a high score of a candidate set of representative elements in one or more previous iterations. Optionally, an amount of elements in a candidate set of representative elements is no greater than an identified maximum amount of elements.

Optionally, each of the plurality of source elements is associated with a probability value, for example an identified initial probability value. Optionally, each of the plurality of candidate sets of elements is generated by selecting from the plurality of source elements a set of candidate elements, where each candidate element is selected according to the respective probability associated therewith. Optionally, in each of the one or more iterations, an iteration highest score is identified in a plurality of scores computed for the plurality of candidate sets generated in the iteration. Optionally, one or more probability values of one or more elements of the respective candidate set of representative elements associated with the iteration highest score are incremented, to increase a likelihood of the one or more elements being selected in a future iteration of the plurality of iterations. Optionally, one or more other probability values of one or more other elements of the plurality of source elements is decreased, to reduce a likelihood of the one or more other elements being selected in a future iteration of the plurality of iterations. Increasing a probability value of an element contributing to an iteration high score and additionally or alternatively decreasing a probability value of an element not contributing to an iteration high score increases a likelihood of a candidate set of representative elements generated in a future iteration having a high score, thus reducing computation time and amount of computation resources required to generate the set of representative elements, thus reducing cost of operation of a system implemented according to the present invention.

In addition, the present invention proposes in some embodiments thereof, sorting the set of representative elements according to a respective order of appearance in the digital documents. Optionally, the set of representative elements are inserted into a digital image in the sorted order described above. The present invention further proposes to optionally insert into the digital image one or more section titles extracted from the digital document, where each of one or more section titles is a title of a section of the digital document comprising a first reference in the digital document to one of the set of representative elements. Optionally, the set of representative elements and the one or more section titles are inserted in order. Optionally, the other digital document is generated using the digital image. Generating a digital image by inserting the set of representative elements and one or more section title in order increases likelihood of the digital image providing an immediate understanding of the digital document's take-home message, increasing accuracy of a multi-modal summary produced using the digital image.

In addition, in some embodiments the present invention proposes inserting into the other digital document one or more interactive links, each linking between a graphical element of the multi-modal summary and a respective textual description thereof. Optionally, when the other digital document is displayed on an interactive device, selection by a user of a graphical element of the other digital document triggers a display of the respective textual description associated with the graphical element. When the interactive device comprises a touch screen, the user may select the graphical element by touching the graphical element. When the interactive device is a computer, for example a desktop computer or a laptop computer, the user may select the graphical element by hovering a cursor of a pointing device, for example a mouse, over the graphical element or by clicking the graphical element using the pointing device. Displaying a textual description associated with a graphical element upon request from a user increases usability of a multi-modal summary generated according to the present invention, providing additional information without cluttering the digital image comprising the multi-modal summary.

In addition, the present invention proposes in some embodiments thereof, a system for publishing a plurality of documents. Some examples of a system for publishing a plurality of documents are a web based document repository, and conference management system. In such embodiments, at least one hardware processor is adapted for receiving a digital document, generating a multi-modal summary of the digital document, adding the digital document to a repository of digital documents and updating a directory of the repository to associated the digital document with another digital document comprising the multi-modal summary. Optionally, the multi-modal summary is generated according the present invention as described above. Optionally, the other document comprising the multi-modal summary is provided in response to a request pertaining to the digital document, for example a request for an abstract of the digital document. Automatically generating another digital document comprising a multi-modal summary of a digital document reduces cost of operation of a publishing system compared to a publishing system where the multi-modal summary is generated manually. In addition, automatically generating the other digital document comprising the multi-modal summary increases usability of the publishing system compared to a publishing system that does not provide multi-modal summaries.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
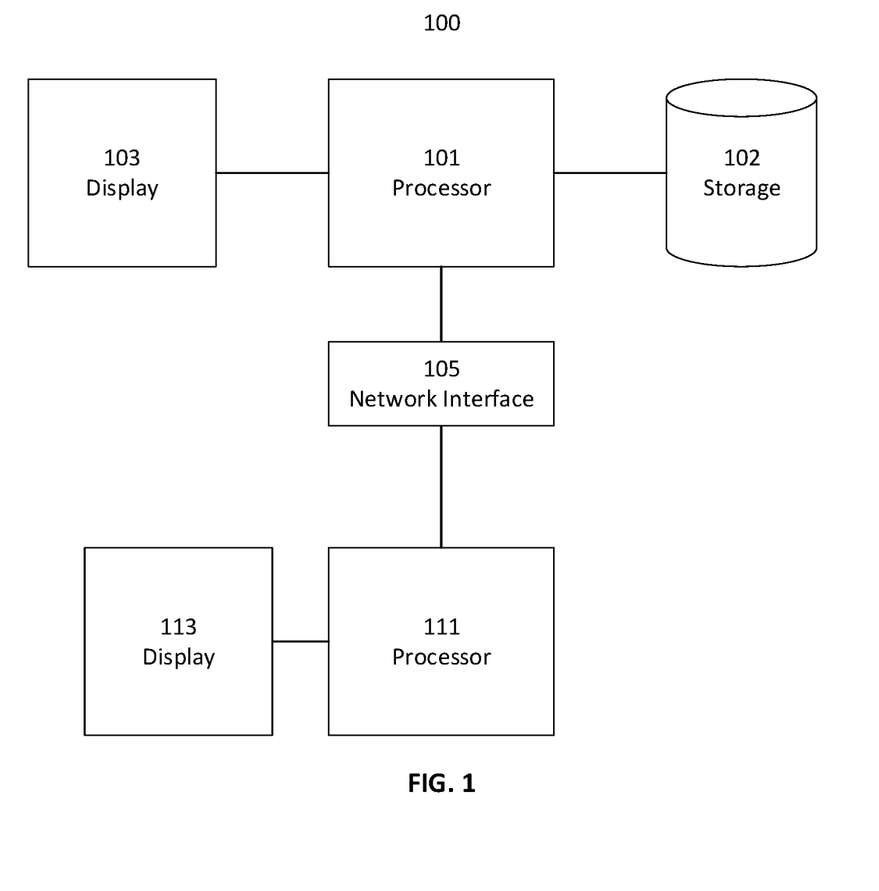
FIG. 1 is a schematic block diagram of an exemplary system, according to some embodiments of the present invention.

Reference is now made to FIG. 1, showing a schematic block diagram of an exemplary system 100, according to some embodiments of the present invention. In such embodiments, processing unit 101 is connected to at least one digital communication network interface 105, optionally for the purpose of receiving one or more digital documents from one or more other processors, for example processing unit 111. A processing unit may be any kind of programmable or non-programmable circuitry that is configured to carry out the operations described below. The processing unit may comprise hardware as well as software. For example, the processing unit may comprise one or more hardware processors and a transitory or non-transitory memory that carries a program which causes the processing unit to perform the respective operations when the program is executed by the one or more hardware processors.

For brevity, the term "network interface" is used to mean "at least one digital communication network interface", and the term "digital storage" is used to mean "at least one non-volatile digital storage".

Optionally, network interface 105 is connected to a local area network (LAN), for example a wired LAN such as an Ethernet network, or a wireless network such as a Wi-Fi network. Optionally network interface 105 is connected to a wide area network (WAN) for example a cellular network such as a Global System for Mobile Communications (GSM) network or the Internet.

Optionally, processing unit 101 is connected to digital storage 102, optionally for the purpose of storing one or more other digital documents generated by processing unit 101, for example another digital document each comprising a multi-modal summary of one of the one or more digital documents. Optionally processing unit 101 is connected to digital storage via network interface 105. Some examples of a digital storage are a hard disk drive, a non-volatile read only memory (NVRAM), a network storage and a storage network.

Optionally, processing unit 101 is connected to one or more display devices 103, optionally for the purpose of displaying at least one multi-modal summary of at least one of the one or more digital documents. Some examples of a display device are a monitor and an interactive device, for example a desktop computer, a smart phone, a tablet, and a laptop computer.

Optionally, system 100 comprises one or more other processing units 111, optionally connected to processing unit 101 via network interface 105. Processing unit 101 may receive one or more digital documents from one or more of other processing units 111 via network interface 105, for example for the purpose of generating one or more multi-modal summaries. Optionally processing unit 101 sends processing unit 111 one or more other digital documents via network interface 105, for example one or more other digital documents comprising one or more multi-modal summaries. Other processing unit 111 may be connected to one or more other display device 113. Other display device 113 may be, but is not limited to being, a monitor or an interactive device. Optionally, other processing unit 111 displays one or more other digital documents, comprising one or more multi-modal summaries, on one or more other display device 113.

To generate a multi-modal summary, in some embodiments of the present invention system 100 implements the following non-mandatory method.

Figure 2:
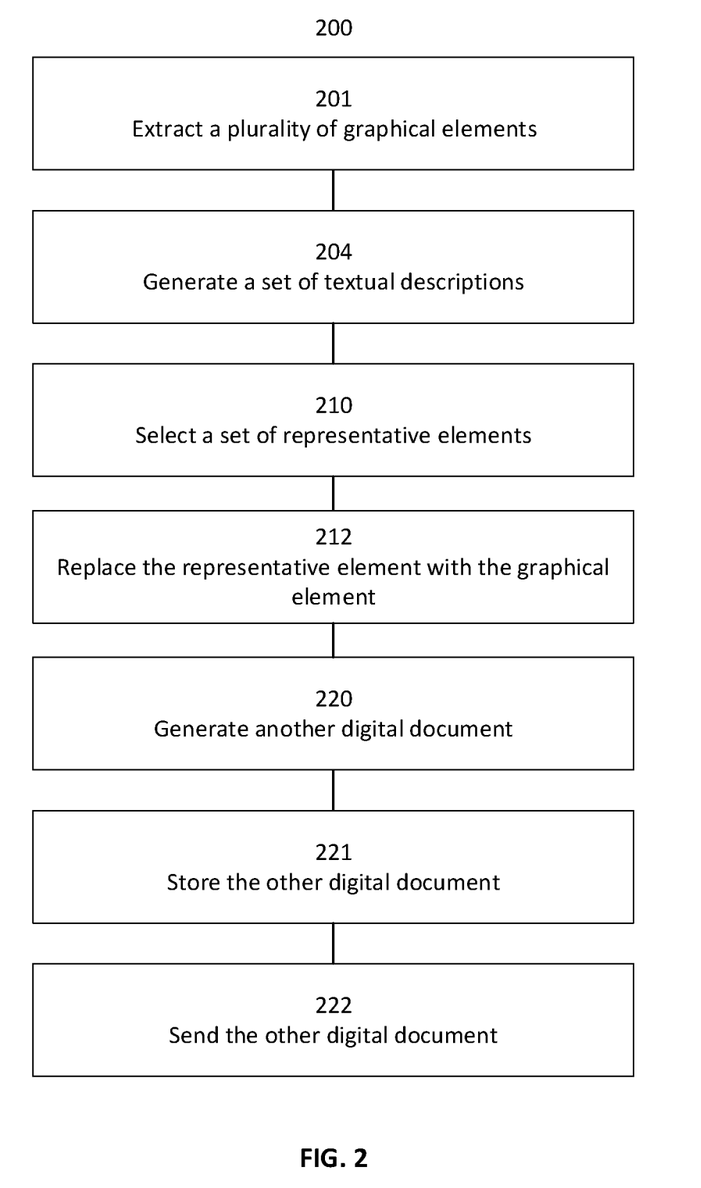
FIG. 2 is a flowchart schematically representing an optional flow of operations for generating a multi-modal summary, according to some embodiments of the present invention.

Reference is now made also to FIG. 2, showing a flowchart schematically representing an optional flow of operations 200 for generating a multi-modal summary, according to some embodiments of the present invention. In such embodiments, in 201 processing unit 101 extracts from a digital document a plurality of graphical elements. A non-limiting list of examples of a graphical element includes: a photograph, a drawing, an illustration, a table, a chart, a flowchart, a diagram, a block diagram, a sequence diagram, a graph, and an algorithm. Optionally, processing unit 101 retrieves the digital document from storage 102. Optionally, processing unit 101 receives the digital document from one or more other processing unit 111. In 204, processing unit 101 optionally generates a set of textual descriptions. Optionally, each textual description of the set of textual descriptions is generated for one of the plurality of graphical elements. Optionally, each textual description is associated with the respective graphical element the textual description was generated therefrom. Optionally, in 210 processing unit 101 selects a set of representative elements from the set of textual descriptions and a set of text fragments extracted from the digital document. Optionally, at least one of the set of text fragments is a sentence extracted from the digital document. Optionally, at least one additional other of the set of text fragments is an identified cue word extracted from the digital document. Optionally, at least one other of the set of text fragments is a clause of a sentence extracted from the digital document. Optionally, at least one further additional other of the set of text fragments is a caption or a section title extracted from the digital document.

Optionally, the set of representative elements has a highest score computed by applying a score function thereto. Optionally, a score of the set of representative elements computed by applying the score function thereto is indicative of a degree by which the set of representative elements represents the digital document.

Figure 3:
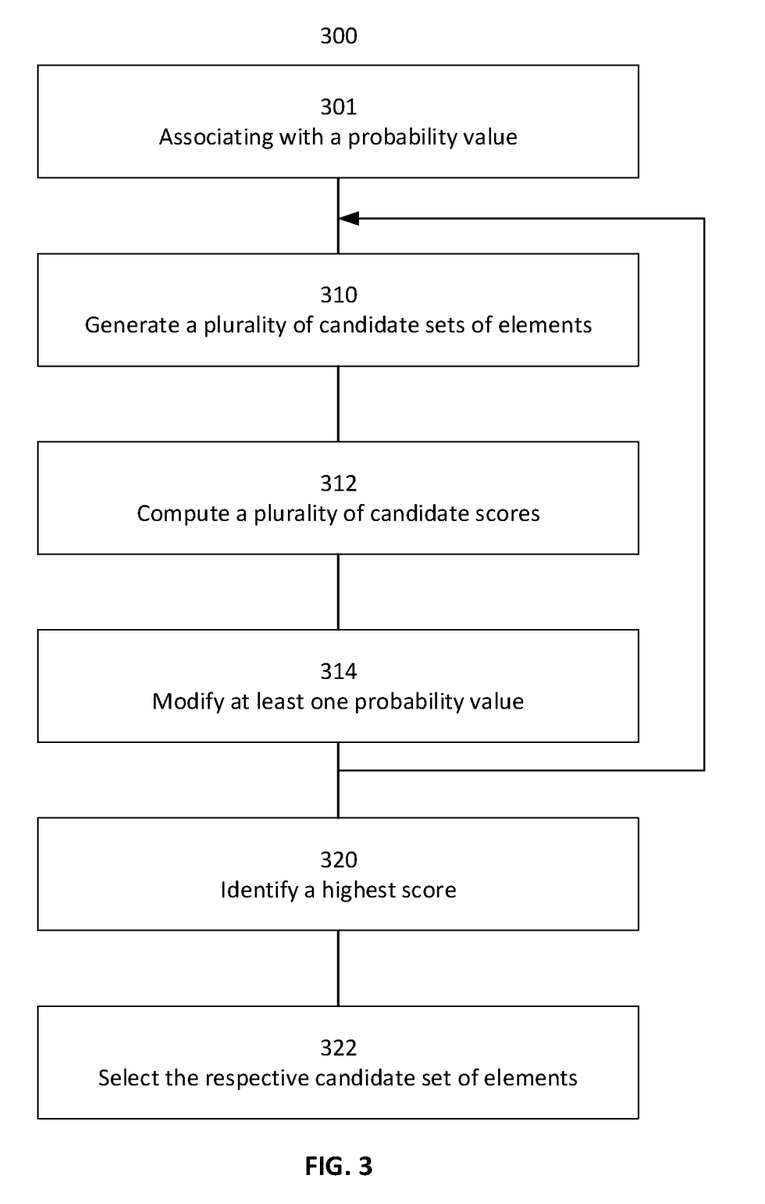
FIG. 3 is a flowchart schematically representing an optional flow of operations for selecting a representative set of elements, according to some embodiments of the present invention.

Reference is now made also to FIG. 3, showing a flowchart schematically representing an optional flow of operations 300 for selecting a representative set of elements, according to some embodiments of the present invention. Optionally, a set of source elements comprises the set of textual descriptions and the set of text fragments extracted from the digital document. Optionally, in 301 processing unit 101 associates each of the plurality of source elements with a probability value. Optionally, the probability value is an identified initial probability value. Optionally, processing unit 101 executes a plurality of iterations. Optionally, in one or more iteration of the plurality of iterations, in 310 processing unit 101 generates a plurality of candidate sets of elements, each generated by selecting, from the plurality of source elements, a set of candidate elements. Optionally each candidate element of the set of candidate elements is selected according to the candidate element's respective probability. In 312, in the one or more iteration, processing unit 101 optionally computes a plurality of candidate scores, each computed by applying the score function to one of the plurality of candidate sets of elements.

Optionally, applying the score function to a candidate set of elements, denoted by K, comprises producing a set of document unigrams, denoted by D. A unigram is a single item extracted from an identified text or speech sample. Optionally, an item is a word. Other examples of a unigram are a phoneme, a syllable, and a letter. Optionally, producing the set of document unigrams comprises extracting from a text of the digital document all unigrams of the text to produce a first set of unigrams, removing from the first set of unigrams all unigrams belonging to an identified set of stop words to produce a second set of unigrams, and for each unigram of at least some of the second set of unigrams, reducing the unigram to its respective stem form. A stop word is an identified word filtered out of a text before processing, for example when processing natural language. Optionally, the identified set of stop words comprises a plurality of common words of a language of the text of the digital document. A stem form of a word is a part of the word that is common to all the word's inflected variants.

Optionally, applying the score function to the candidate set of elements comprises producing for the candidate set of elements a set of candidate unigrams, denoted by S. Optionally, producing the set of candidate unigrams comprises extracting from the candidate set of elements all unigrams of the candidate set of elements to produce a first set of candidate unigrams, removing from the first set of candidate unigrams all unigrams belonging to the identified set of stop words to produce a second set of candidate unigrams, and for each candidate unigram of at least some of the second set of candidate unigrams, reducing the candidate unigram to its respective stem form.

Optionally, applying the score function to the candidate set of elements comprises computing for each member of the set of document unigrams, denoted by i, a respective frequency in the text of the digital document, denoted by $q_i$.

Optionally, applying the score function to the candidate set of elements comprises computing for each member i of the set of document unigrams a respective profile, denoted by $p_i$, where $q_i=p_i$ when i is a member of the set of candidate unigrams S, otherwise $q_i=0$.

Optionally, applying the score function to the candidate set of elements comprises computing a similarity score, indicative of a degree of relevance of the candidate set of elements to the text of the digital document. Optionally, the similarity score is computed such that a set having a high relevance to the text has a high similarity score. Optionally the similarity score, denoted by SimScore, is computed according to the following equation:

$$SimScore = \sum_{i \in D} p_i q_i \qquad (1)$$

Optionally, applying the score function to the candidate set of elements comprises identifying one or more highest frequencies in the plurality of frequencies computed for the set of document elements. Optionally, applying the score function to the candidate set of elements comprises computing for each member i of the set of document unigrams a respective normalized frequency, denoted by $v_i$, by normalizing the member's respective frequency $q_i$ according to the one or more highest frequencies.

Optionally, applying the score function to the candidate set of elements comprises computing a coverage score, indicative of a degree of representation of the text of the digital document by the candidate set of elements. Optionally, the coverage score is computed such that a set highly representative of the text of the digital document has a high coverage score. Optionally the coverage score, denoted by CovScore, is computed according to the following equation:

$$CovScore = \sum_{i \in D} v_i p_i \qquad (2)$$

Optionally, applying the score function to the candidate set of elements comprises computing a diversity scores, indicative of an amount of dissimilar topics described by the candidate set of elements. Optionally, the diversity score is computed such that a set describing a high amount of dissimilar topics has a high diversity score. Optionally the diversity score, denoted by DivScore, is computed according to the following equation:

$$DivScore = \sum_{(i \in D, p_i > 0)} -p_i \log(p_i) \qquad (3)$$

Optionally, applying the score function to the candidate set of elements comprises computing an amount of elements in the candidate set of elements, denoted by K.

Optionally, applying the score function to the candidate set of elements comprises computing a size score, indicative of an amount of elements in the candidate set of elements. Optionally, a set having few elements has a high size score. Optionally the size score, denoted by SizeScore is computed according to the following equation:

$$SizeScore = 1 + \frac{1}{|K|} \qquad (4)$$

Where |K| denotes the amount of elements in K.

Optionally, applying the score function to the candidate set of elements comprises computing a position score, indicative of a degree by which the candidate set of elements appears the digital document's beginning. Optionally, a set having elements appearing close to the beginning of the digital document has a high position score. Optionally the position score, denoted by PosScore is computed according to the following equation:

$$PosScore = \left( \prod_{K \in \tilde{K}} \left(1 + \frac{1}{1 + \text{position of } k}\right) \right)^{\frac{1}{|K|}} \qquad (5)$$

Where:
k denotes a text element of the candidate set of elements K, and
position of K denotes an amount of characters between a beginning of the text of the digital document and a first appearance of k in the text.

Optionally, applying the score function to the candidate set of elements comprises computing an image detail score, indicative of an amount of details depicted in one or more graphical elements of the plurality of graphical elements described by one or more of the candidate set of elements. Optionally, the image detail score reflects one or more of: a size of a graphical element, an amount of references in the digital document to the graphical element, an a color profile of the graphical element, for example a distribution of the graphical element's pixels in a red-green-blue (RGB) space, optionally to be used as an indication of a type of the graphical element, for example to distinguish between a plurality of data element types, including a data graph, a concept illustration and a photograph.

Optionally, applying the score function to the candidate set of elements comprises computing a product of the similarity score, the coverage score, the diversity score, the position score, the size score, and the image detail score.

Optionally, applying the score function to the candidate set of elements comprises executing at least one neural network, optionally trained to predict a score of a set of text elements.

In 314, in the one or more iterations, processing unit 101 optionally modifies one or more probability values of one or more of the plurality of source elements according to the plurality of candidate scores. Optionally, the modified one or more probability values are used in one or more next iterations of the plurality of iterations.

Figure 4:
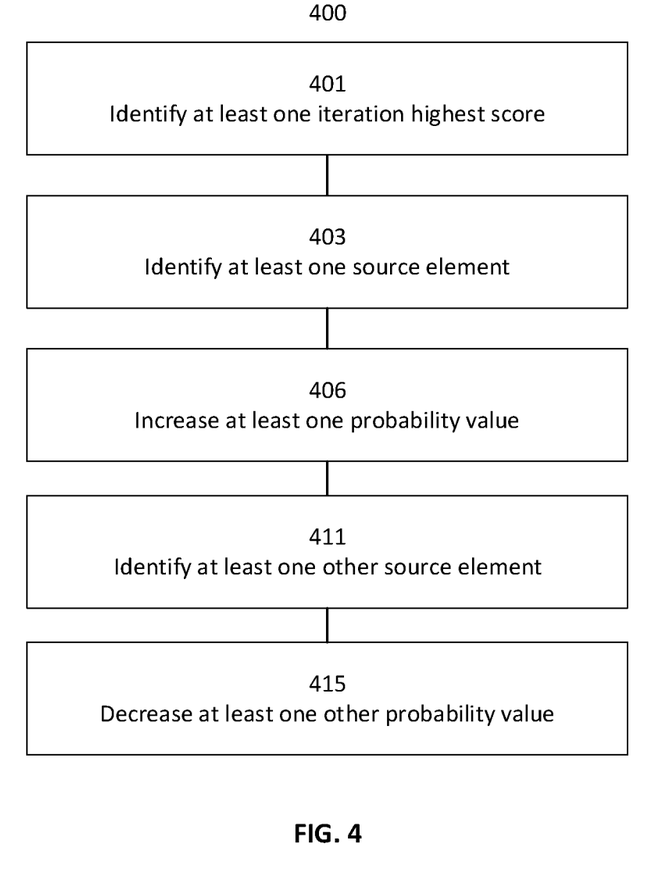
FIG. 4 is a flowchart schematically representing an optional flow of operations for modifying a probability value, according to some embodiments of the present invention.

Reference is now made also to FIG. 4, showing a flowchart schematically representing an optional flow of operations 400 for modifying a probability value, according to some embodiments of the present invention. In such embodiments, in 401 processing unit 101 identifies in the plurality of candidate scores one or more highest scores, i.e. one or more highest scores computed in one iteration. In 403, processing unit 101 optionally identifies at least one high scoring candidate set of elements associated with at least one of the one or more highest scores. Optionally, processing unit 101 identifies in the at least one high scoring candidate set of elements one or more source elements of the plurality of source elements, and in 406 processing unit 101 optionally increases the one or more probability values associated with the one or more source elements, optionally increasing a likelihood of selecting the one or more source elements for at least one other candidate set of elements selected in the one or more next iterations.

Optionally, in 411, processing unit 101 identifies one or more other source elements of the plurality of source elements such that the one or more other source elements are not members of the at least one high scoring candidate set of elements. Optionally, in 415 processing unit 101 decreases the one or more other probability values associated with the one or more other source elements, optionally decreasing a likelihood of selecting the one or more other source elements for the at least one other candidate set of elements selected in the one or more next iterations.

Reference is now made again to FIG. 3. Optionally, 310, 312 and 314 are repeated in each of the one or more iterations.

In 320, processing unit 101 optionally identifies a highest score of the plurality of candidate scores computed in one or more of the plurality of iterations, and in 322 processing unit 101 optionally selects the respective candidate set of elements associated with the highest score as the set of representative elements. Optionally, processing unit 101 identifies the highest score after executing an identified amount of iterations. Optionally, processing unit 101 identifies the highest score after executing another identified amount of iterations where no higher score was identified. Optionally, processing unit 101 identifies the highest score after processing unit 101 generates an identified amount of candidate sets of representative elements. Optionally, processing unit 101 uses a cross-entropy based method is used to identify the highest score.

Reference is now made again to FIG. 2. In 212, processing unit 101 optionally replaces at least some of the set of representative elements, by replacing each representative element of the at least some representative elements where the representative element is a textual description of a graphical element of the plurality of graphical elements with the graphical element associated therewith. Optionally, in 220 processing unit 101 optionally generates another digital document comprising a multi-modal summary of the digital document. Optionally, processing unit 101 generates the other digital document using the set of representative elements.

Optionally, processing unit 101 generates the other digital document further using a plurality of interactive links, each associated with one of the set of representative elements and one of the plurality of graphical elements.

Figure 5:
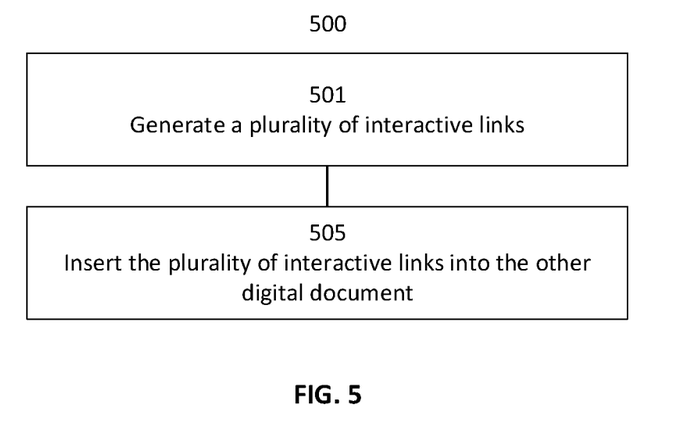
FIG. 5 is a flowchart schematically representing an optional flow of operations for generating interactive links, according to some embodiments of the present invention.

Reference is now made also to FIG. 5, showing flowchart schematically representing an optional flow of operations 500 for generating interactive links, according to some embodiments of the present invention. In such embodiments, in 501, processing unit 101 generates a plurality of interactive links. Optionally each link of the plurality of interactive links is generated for one element of the set of representative elements where the one element is additionally in the plurality of graphical elements. Optionally, the link comprises the respective textual description associated with the respective one element. In 505, processing unit 101 optionally inserts the plurality of interactive links into the other digital document. Optionally, each link of the plurality of interactive links is inserted such that when the other digital document is displayed on an interactive device, selection of the link's graphical element by a user instructs the interactive device to display the respective textual description associated with the graphical element.

Figure 6:
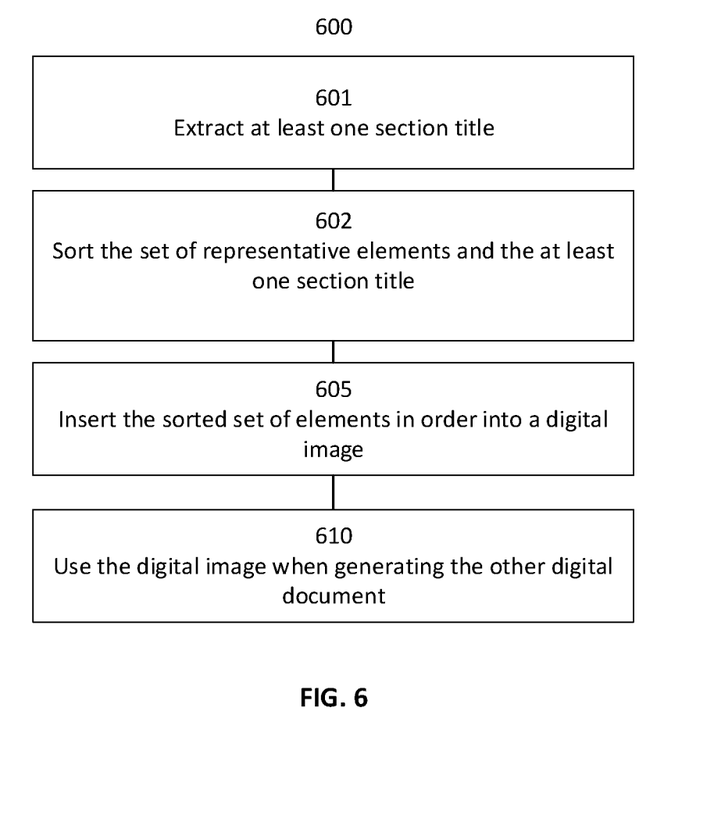
FIG. 6 is a flowchart schematically representing an optional flow of operations for generating a document comprising a multi-modal summary, according to some embodiments of the present invention.

Reference is now made also to FIG. 6, showing a flowchart schematically representing an optional flow of operations 600 for generating a document comprising a multi-modal summary, according to some embodiments of the present invention. In such embodiments, processing unit 101 generates a multi-modal summary of the digital document using the set of representative elements. Optionally, in 601 processing unit 101 extracts from the digital document one or more section titles. Optionally, processing unit 101 extracts each of the one or more section titles by identifying a first reference in the digital document to one element of the set of representative elements and extracting from the digital document a section title of a section of the digital document comprising the first reference. In 602, processing unit 101 optionally sorts the set of representative elements and the one or more section titles according to a respective order of appearance in the digital document, to produce a sorted set of elements. Optionally, in 605 processing unit 101 inserts the sorted set of elements in order into a digital image.

Optionally, processing unit 101 uses in 610 the digital image when generating the other digital document.

Reference is now made again to FIG. 2. In 221, processing unit 101 optionally stores the other digital document on storage 102. In 222, processing unit 101 optionally sends the other digital document to other processing unit 111, for example for the purpose of processing unit 111 displaying the other digital document on one or more other display device 113.

In some embodiments of the present invention, system 100 is a publishing system. In such embodiments, system 100 may implement the following optional method.

Figure 7:
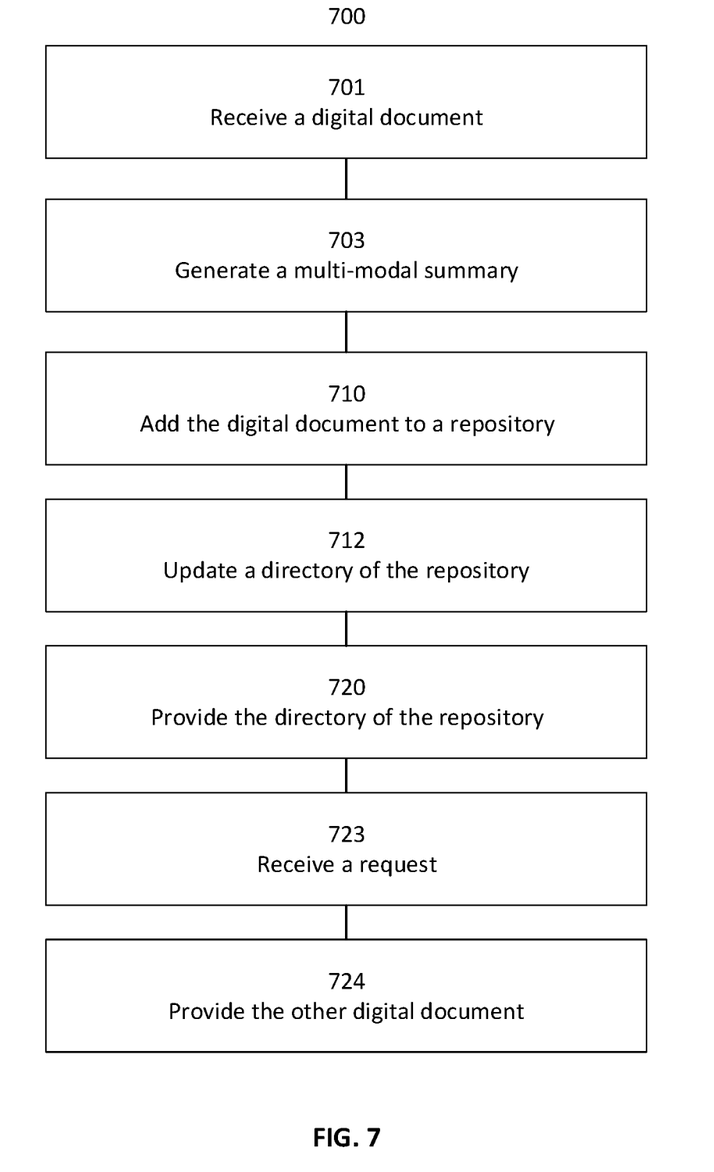
FIG. 7 is a flowchart schematically representing an optional flow of operations for a publishing system, according to some embodiments of the present invention.

Reference is now made also to FIG. 7, showing a flowchart schematically representing an optional flow of operations 700 for a publishing system, according to some embodiments of the present invention. In such embodiments, processing unit 101 receives in 701 a digital document. Optionally, processing unit 101 receives the digital document via network interface 105, optionally from at least one other processing unit (not shown). In 703, processing unit 101 optionally generates a multi-modal summary of the digital document. Optionally, processing unit 703 produces another digital document comprising the multi-modal summary of the digital document, optionally using method 200.

In 710, processing unit optionally adds the digital document to a repository of digital documents, optionally on storage 102. In 712, processing unit optionally updates a directory of the repository, to associate the digital document with the other digital document produced in 703.

Optionally, processing unit 101 repeats 701, 703, 710, and 712 in each of a plurality of publishing iterations.

Optionally, processing unit 101 provides in 720 the directory of the repository, optionally to processing unit 111, optionally via network interface 105. In 723, processing unit 101 optionally receives a request for an abstract of the digital document, optionally the digital document is selected from the directory. Optionally processing unit 101 receives the request from processing unit 111, optionally via network interface 105. In 724, processing unit 101 optionally provides the other digital document associated with the digital document, in response to the request. Optionally, processing unit 101 provides the other digital document by displaying the other digital document on one or more display device 103. Optionally, processing unit 101 provides the other digital document by sending the other digital document to processing unit 111, optionally via network interface 105. Optionally, processing unit 111 is adapted to display the other digital document on one or more other display device 113.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant digital documents and many relevant graphical elements will be developed and the scope of the terms "digital document" and "graphical element" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for generating a multi-modal summary of a digital document, comprising at least one hardware processor adapted for:
   extracting from the digital document a plurality of graphical elements;
   generating a set of textual descriptions, each generated for one of the plurality of graphical elements and associated therewith;
   selecting, from the set of textual descriptions and a set of text fragments extracted from the digital document, a set of representative elements having a highest score computed by applying thereto a score function, where a set of representative elements' score is indicative of a degree by which the set of representative elements represents the digital document;
   for each representative element of at least some of the set of representative elements, where the representative element is a textual description of a graphical element of the plurality of graphical elements, replacing the representative element with the graphical element associated therewith; and
   generating, using the set of representative elements, another digital document comprising a multi-modal summary of the digital document.

2. The system of claim 1, wherein selecting the set of representative elements having a highest score comprises:
   using the set of textual descriptions and the set of text fragments extracted from the digital document as a plurality of source elements;
   associating each of the plurality of source elements with a probability value;
   in at least one of a plurality of iterations:
      generating a plurality of candidate sets of elements, each generated by selecting, from the plurality of source elements, a set of candidate elements, each candidate element selected according to the respective probability thereof;
      computing a plurality of candidate scores, each computed for one of the plurality of candidate sets of elements by applying the score function to the respective set of candidate elements; and
      modifying at least one probability value of at least one of the plurality of source elements according to the plurality of candidate scores for use in a next iteration of the plurality of iterations;
   identifying a highest score of the plurality of candidate scores computed in one or more of the plurality of iterations; and
   selecting the respective candidate set of elements associated with the highest score as the set of representative elements.

3. The system of claim 2, wherein modifying the at least one probability value comprises:
   identifying in the plurality of candidate scores at least one iteration highest score;
   identifying in at least one high scoring candidate set of elements, associated with at least one of the at least one iteration highest score, at least one source element of the plurality of source elements; and
   increasing the at least one probability value associated with the at least one source element.

4. The system of claim 2, wherein modifying the at least one probability value further comprises:
  identifying at least one other source element of the plurality of source elements not in the at least one high scoring candidate set of elements; and
  decreasing the at least one other probability value associated with the at least one other source element.

5. The system of claim 1, wherein applying the score function to the set of representative text elements comprises computing at least one of:
  a similarity score, indicative of a degree of relevance of the set of representative text elements to a text of the digital document;
  a coverage score, indicative of a degree of representation by the set of representative text elements of the text of the digital document;
  a diversity score, indicative of an amount of dissimilar topics described by the set of representative text elements;
  a position score, indicative of a degree by which the set of representative text elements appear at the digital document's beginning;
  a size score, indicative of an amount of elements in the set of representative text elements; and
  an image detail score, indicative of an amount of details depicted in one or more graphical elements of the plurality of graphical elements described by one or more of the set of representative text elements.

6. The system of claim 5, wherein applying the score function to the set of representative text elements comprises computing a product of the similarity score, the coverage score, the diversity score, the position score, the size score, and the image detail score.

7. The system of claim 1, wherein generating the other digital document using the set of representative elements comprises:
  generating the multi-modal summary of the digital document using the set of representative elements by:
    extracting from the digital document at least one section title by, for at least one representative element of the set of representative elements:
      identifying a first reference in the digital document to the at least one representative element; and
      extracting from the digital document a section title of a section of the digital document comprising the first reference;
    sorting the set of representative elements and the at least one section title according to a respective order of appearance in the digital document, to produce a sorted set of elements; and
    inserting in order the sorted set of elements into a digital image; and
  using the digital image when generating the other digital document.

8. The system of claim 1, wherein generating the other digital document further comprises:
  generating a plurality of interactive links, each generated for one of the set of representative elements being in the plurality of graphical elements and comprising the respective textual description associated with the representative element; and
  inserting the plurality of interactive links into the other digital document such that, when the other digital document is displayed on an interactive device, selection by a user of a graphical element of the other digital document instructs the interactive device to display the respective textual description associated with the graphical element.

9. The system of claim 1, wherein at least one of the plurality of graphical elements is selected from a group consisting of: a photograph, a drawing, an illustration, an algorithm, a table, a chart, a flowchart, a diagram, a block diagram, a sequence diagram, and a graph.

10. The system of claim 1, wherein the at least one hardware processor is further adapted for storing the other digital document on at least one non-volatile digital storage connected to the at least one hardware processor.

11. The system of claim 1, wherein the at least one hardware processor is further adapted for sending the other digital document to at least one other hardware processor via at least one digital communication network interface connected to the at least one hardware processor.

12. A method for generating a multi-modal summary of a digital document, comprising:
  extracting from the digital document a plurality of graphical elements;
  generating a set of textual descriptions, each generated for one of the plurality of graphical elements and associated therewith;
  selecting, from the set of textual descriptions and a set of text fragments extracted from the digital document, a set of representative elements having a highest score computed by applying thereto a score function, where a set of representative elements' score is indicative of a degree by which the set of representative elements represents the digital document;
  for each representative element of at least some of the set of representative elements, where the representative element is a textual description of a graphical element of the plurality of graphical elements, replacing the representative element with the graphical element associated therewith; and
  generating, using the set of representative elements, another digital document comprising a multi-modal summary of the digital document.

13. A system for publishing a plurality of documents, comprising at least one hardware processor adapted for:
  in each of a plurality of iterations:
    receiving a digital document;
    generating a multi-modal summary of the digital document by:
      extracting from the digital document a plurality of graphical elements;
      generating a set of textual descriptions, each generated for one of the plurality of graphical elements and associated therewith;
      selecting, from the set of textual descriptions and a set of text fragments extracted from the digital document, a set of representative elements having a highest score computed by applying thereto a score function, where a set of representative elements' score is indicative of a degree by which the set of representative elements represents the digital document;
      for each representative element of at least some of the set of representative elements, where the representative element is a textual description of a graphical element of the plurality of graphical elements, replacing the representative element with the graphical element associated therewith; and generating, using the set of representative elements, another digital document comprising a multimodal summary of the digital document;

adding the digital document to a repository of digital documents; and updating a directory of the repository to associate the digital document with the other digital document.

14. The system of claim 13, wherein the at least one hardware processor is further adapted for:

providing the directory of the repository;

receiving a request for an abstract of the digital document, where the digital document is selected from the directory; and providing, in response to the request, the other digital document associated with the digital document.

15. The system of claim 14, wherein providing the other digital document comprises displaying the other digital document on an interactive device connected to the at least one hardware processor.

16. The system of claim 14, wherein the request is received from at least one other hardware processor via at least one digital communication network interface connected to the at least one hardware processor;

wherein providing the other digital document comprises sending the other digital document to the at least one other hardware processor via the at least one digital communication network interface; and wherein the at least one other hardware processor is adapted for displaying the other digital document on an interactive device connected to the at least one other hardware processor.

* * * * *